(12) United States Patent
Faviero et al.

(10) Patent No.: US 10,366,293 B1
(45) Date of Patent: Jul. 30, 2019

(54) COMPUTER SYSTEM AND METHOD FOR IMPROVING SECURITY SCREENING

(71) Applicant: Synapse Technology Corporation, Sherman Oaks, CA (US)

(72) Inventors: Bruno Brasil Ferrari Faviero, Coconut Creek, FL (US); Simanta Gautam, Charlottesville, VA (US); Ian Cinnamon, Sherman Oaks, CA (US)

(73) Assignee: Synapse Technology Corporation, Palo Alto, CA (US)

( * ) Notice: Subject to any disclaimer, the term of this patent is extended or adjusted under 35 U.S.C. 154(b) by 0 days.

(21) Appl. No.: 16/110,605

(22) Filed: Aug. 23, 2018

Related U.S. Application Data

(60) Provisional application No. 62/662,012, filed on Apr. 24, 2018.

(51) Int. Cl.
  *G06K 9/00* (2006.01)
  *G06N 20/00* (2019.01)

(52) U.S. Cl.
  CPC ......... *G06K 9/00771* (2013.01); *G06N 20/00* (2019.01)

(58) Field of Classification Search
  CPC .................... G06K 9/00771; G06N 99/005
  See application file for complete search history.

(56) References Cited

U.S. PATENT DOCUMENTS

| | | | |
|---|---|---|---|
| 7,193,515 B1* | 3/2007 | Roberts | B64F 1/368 340/10.42 |
| 9,911,282 B2* | 3/2018 | Alewine | A63F 13/75 |
| 9,996,890 B1* | 6/2018 | Cinnamon | G06T 7/73 |
| 2002/0186862 A1* | 12/2002 | McClelland | B64F 1/368 382/100 |
| 2004/0124982 A1* | 7/2004 | Kovach | G08B 13/2417 340/572.1 |

(Continued)

FOREIGN PATENT DOCUMENTS

| CN | 104240784 | 12/2014 |
|---|---|---|
| JP | 103997 A | 11/1992 |

(Continued)

OTHER PUBLICATIONS

Shaoqing, et al., "Faster R-CNN: Towards Real-Time Object Detection with Region Proposal Networks," IEEE Transactions on Pattern Analysis and Machine Intelligence, vol. 39, No. 6, Jun. 1, 2017, pp. 1137-1149.

(Continued)

*Primary Examiner* — Ming Y Hon

(57) ABSTRACT

In an example, a computing device comprises at least one processor, a memory, and a non-transitory computer-readable storage medium storing instructions thereon that, when executed, cause the at least one processor to perform functions comprising: performing an initial security screening on an object based on a first set of security-related data associated with the object and a first set of security screening parameters, and performing a supplemental security screening on the object based on a second set of security-related data associated with the object and a second set of security screening parameters. The first set of security-related data may be different from the second set of security-related data, and the first set of security screening parameters may be different from the second set of security screening parameters.

20 Claims, 2 Drawing Sheets

(56) References Cited

U.S. PATENT DOCUMENTS

| | | | |
|---|---|---|---|
| 2007/0115123 A1* | 5/2007 | Roberts | G06Q 10/08 340/568.1 |
| 2007/0121783 A1 | 5/2007 | Ellenbogen et al. | |
| 2008/0056444 A1* | 3/2008 | Skatter | G01N 23/046 378/57 |
| 2008/0270462 A1* | 10/2008 | Thomsen | G06F 17/30545 |
| 2008/0309484 A1* | 12/2008 | Francis | G08B 13/196 340/540 |
| 2010/0166322 A1* | 7/2010 | Madruga | G01V 5/0008 382/218 |
| 2011/0206240 A1* | 8/2011 | Hong | G06K 9/00771 382/103 |
| 2013/0086674 A1* | 4/2013 | Horvitz | G06F 21/32 726/19 |
| 2013/0126299 A1* | 5/2013 | Schoepe | G01V 5/0083 198/340 |
| 2013/0208124 A1* | 8/2013 | Boghossian | H04N 7/181 348/159 |
| 2014/0198899 A1* | 7/2014 | Ziskin | G01T 1/2985 378/53 |
| 2014/0270536 A1* | 9/2014 | Amtrup | G06K 9/00442 382/195 |
| 2016/0356915 A1* | 12/2016 | Green | G01V 5/0041 |

FOREIGN PATENT DOCUMENTS

| | | |
|---|---|---|
| JP | 2010520542 A | 6/2010 |
| JP | 2017062781 A | 3/2017 |

OTHER PUBLICATIONS

Akcay, et al., "Transfer Learning Using Convolutional Neural Networks for Object Classification Within X-Ray Baggage Security Imagery," IEE International Conference on Image Processing (ICIP), Sep. 25, 2016, pp. 1057-1061.

European Patent Office, European Extended Search Report dated Nov. 27, 2018, issued in connection with European Patent Application No. 18183573.7, 11 pages.

* cited by examiner

COMPUTER SYSTEM AND METHOD FOR IMPROVING SECURITY SCREENING

PRIORITY CLAIM

This application claims priority to U.S. Provisional Patent No. 62/662,012 titled "Computer System and Method for Improving Security Screening," filed on Apr. 24, 2018 the contents of which are incorporated by reference in its entirety.

FIELD OF THE DISCLOSURE

The disclosure is generally related to screening security systems for use in public or private applications and, more particularly, to methods, systems, devices, and other elements directed to performing screening on an object.

BACKGROUND

Today, the security agencies employ tens of thousands of screeners at security checkpoints. A screener's job is to check objects for security threats and to determine whether a given object should be permitted through the security checkpoint and/or onto a destination. To check whether a piece of baggage is a security threat, the baggage is run through a detection device, such as a scanner, and with the aid of the scanner, the screener flags suspicious pieces of baggage that appear to contain an object that is a security threat. If the baggage is flagged as suspicious, the screener searches to the contents of the piece of baggage by hand to determine whether an object that is a security threat is present in the piece of baggage.

Even more, a screener's job may be both difficult and monotonous. This difficulty and monotonousness may increase the chance that a piece of baggage that is a security threat gets through the screening process without being detected. Further, with the ever-growing volume of international travel, differing border security standards at different international borders may present challenges for security screening personnel, passengers and/or objects travelling between security checkpoints with differing levels of security.

BRIEF DESCRIPTION OF THE DRAWINGS

Features, aspects, and advantages of the presently disclosed technology may be better understood with respect to the following description, appended claims, and accompanying drawings where:

Figure 1:
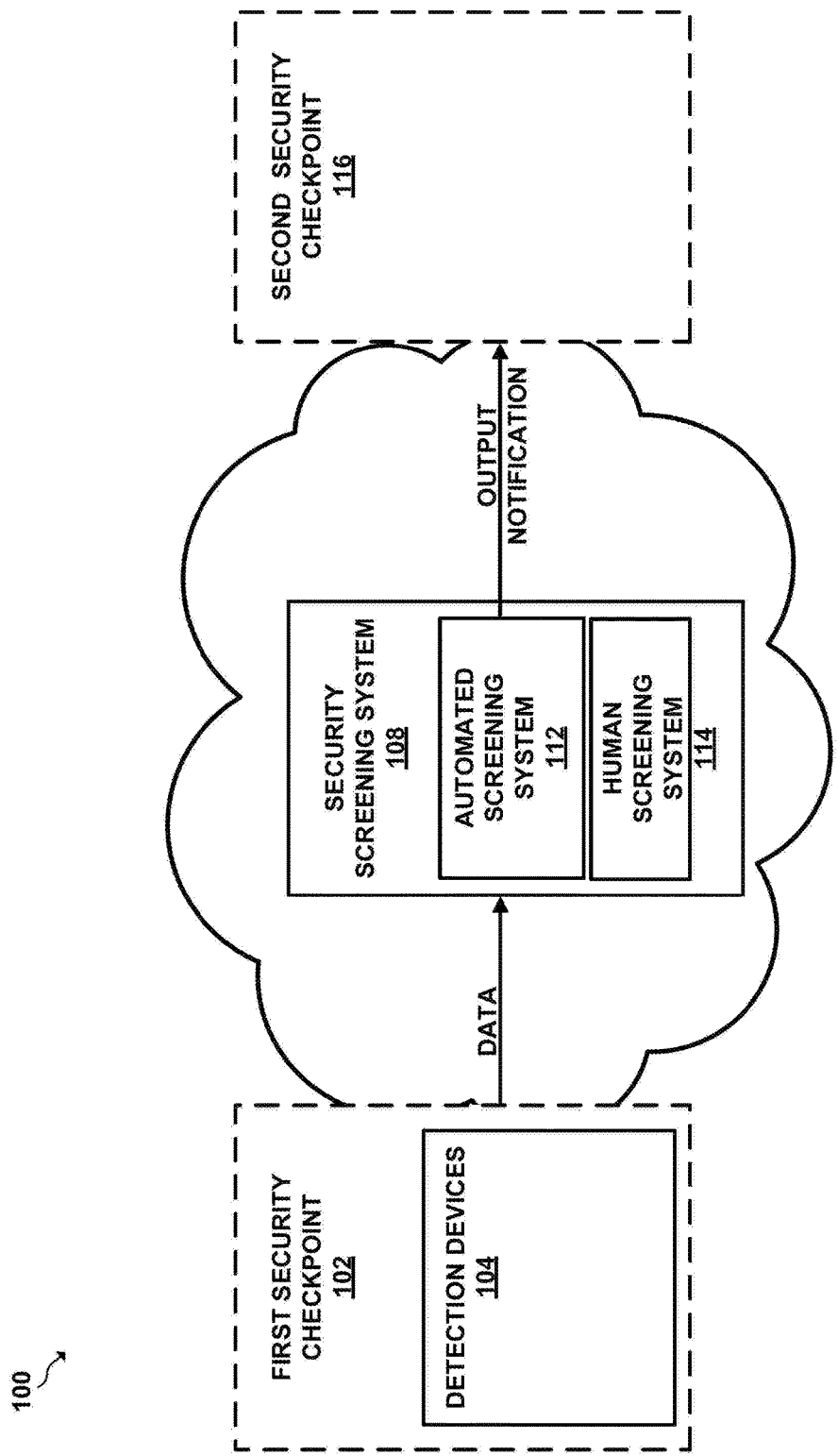
FIG. 1 is a conceptual diagram illustrating a computer system configured to perform anomaly determination.

The drawings are for illustrating example embodiments, and the inventions are not limited to the arrangements and instrumentality shown in the drawings.

DETAILED DESCRIPTION

I. Overview

Synapse Technology Corporation ("Synapse"), a technology company currently based out of Palo Alto and the assignee of the present application, created a system that greatly modernizes the image intelligence industry with proprietary deep learning and computer vision technology. Synapse-created technology may be used in the security screening process to, among other things, increase accuracy significantly, while avoiding false positives and increasing the throughput of passengers at the checkpoint. The Synapse technology may be used in many industries, such as those that relate to public and private security and defense, transportation, freight and logistics, and numerous other industries as well. The Synapse technology may also be used for tasks outside of security, such as customs enforcement, anti-trafficking monitoring, and numerous other applications as well.

The security screening process involves screening various objects to make determinations about the objects based on the outcome of the screening, such as whether various objects should be allowed to pass through a given security checkpoint and onto their destination(s). As described herein security screening may comprise making various different types of determinations about a given object. For example, security screening may comprise screening objects to determine whether they may: pose a security threat, are contraband, comply with customs and/or border protocols, comply with agricultural regulations, financial regulations, etc. The security screening may comprise making various other determinations about objects as well.

The screening process may typically involve various automated and/or human inspection and analysis of various objects. For example, such objects may comprise people or other living things, or inanimate objects such as pieces of luggage, laptop computers, and/or the like. However, the capturing of image data of the scanned objects, and examining the captured image data is laborious, slow, expensive, and not accurate. The process is expensive and time consuming in part because a human security screening operator must review each image generated by a security scanner of each scanned object.

The security screening process may also be time consuming because the entire security process must typically be completed while objects or people are actively undergoing security screening and examination at the security checkpoint, e.g. by security screening officers, detection devices, etc. Examples of such times that objects or people are under active security screening and examination may include as some non-limiting examples: (1) when a piece of is going through an X-ray machine during which a security operator may only be able to view 2-3 bags at a time, and may only focus on one bag at a time), (2) when a person's body is scanned by an AIT (Advanced Imaging Technology) scanner or metal detector, (3) when a security screening officer swabs the a person's belongings for explosives, (4) when a security screening officer pats down a person or inspects his/her baggage. Outside of these instances, no further security screening (e.g. analysis of images or inspection) may be performed until a person arrives at another security checkpoint, such as at customs after having arrived from an international airport.

In addition to being a slow and human-intensive labor process, the security screening process may also be inaccurate because: (1) the amount of time needed for a security operator to analyze each screened object may be longer than is permissible in order to handle a desired level of throughput of objects passing through the detection devices, and (2) because human security screening operators may suffer from fatigue, which may impact their ability to continue to accurately identify items from image data captured by the detection devices.

Further yet, the advent of additional and more advanced computer hardware and software at security checkpoints, may allow collection of security-related data, which could, if analyzed, improve detection of security threats. Examples of such security-related data may comprise data produced using more advanced, time-consuming and in-depth scanning, data that may be obtained and combined from multiple security-related sources such as: intelligence agencies, governmental bodies, security authorities, border and customs control, multiple security scanning devices; and various other sources as well. However, even though this additional security-related data could be analyzed to improve detection of security threats, the time necessary to analyze such data at a security checkpoint during a security screening would further add to the time that the object undergoes security screening.

One solution to the problem of analyzing data generated by detection devices involves Synapse's technology, which may enhance the security screening process by enabling automatic detection of certain classes of items at security checkpoints by using advanced computerized techniques to perform security screening. These object detection techniques may automate the process of analyzing scanned images of objects generated by detection devices at the security checkpoint and identifying classes of items from the generated images. Automating the screening process may improve the screening throughput at the security checkpoint, which may in turn lower costs, and reduce the need for labor-intensive manual inspection and screening.

Increasingly, such computerized techniques will be deployed to automate the process of identifying classes of items, including both hazardous and non-hazardous items at security checkpoints and other locations. Such identification techniques may also be used to aid human security operators in their efforts to identify classes of items from scans of objects (e.g. scan images) generated by the various detection devices.

However, such object detection techniques may not be "one size fits all" solutions. That is, a given object detection technique may need to operate differently based on differing security requirements. For example, security standards may rapidly shift in some jurisdictions but not others, whereupon a new type of item may be banned from cabin baggage in Europe but not banned in Africa, presenting a security vulnerability for flights from Africa flying into or connecting through EU airports. Further, such object detection techniques may suffer from other drawbacks that may result in increased security screening time for objects, which may lead to unacceptable security screening outcomes.

As such, Synapse has developed additional techniques, which are described herein, that improve the security screening process by utilizing techniques for (1) enabling a computing system to analyze additional security-related data during security screenings, (2) improving accuracy of security screenings, and (3) security screening improving throughput of objects (e.g., luggage, people, cargo, etc.) that pass through security checkpoints.

At a high level the techniques of this disclosure improve security screening by dividing the security screening process into two phases: (1) an initial security screening, and (2) a supplemental security screening. During the initial screening, an object entering a security checkpoint may be screened using a first set of screening parameters and based on a first set of security-related data which may be available at the time of the initial screening. For instance, the initial set of screening parameters may comprise a set of parameters that may be used to control or configure the operation of an automated and/or manual screening process, such as an object detection system. The set of security-related data may comprise e.g. security-related data that may be available at the time of the screening to the various systems performing the initial security screening.

The supplemental security screening may analyze a given object using a second set of screening parameters and/or a second set of security-related data that is available at the time of the supplemental screening. The second set of parameters may comprise the same or different parameters as those used in the initial security screening. For instance, the second set of parameters of the supplemental security screening may configure a manual and/or an automated screening system, such as object detection system to analyze image data with greater accuracy, e.g. using different object detections algorithm(s), etc. The second set of security-related data may comprise data that may not have been considered during the initial security screening. For instance, the second set of security-related data may comprise data such as customs and border control data that may not have been available at the time of the initial security screening. The initial and supplemental security screening processes may take various other forms as well as will be described in greater detail herein.

As one example, the additional screening techniques of this disclosure may improve scanning throughput by performing a re-security screening of an i.e. analyzing security data related to a given object after an initial security screening on the object has already begun or has finished. Such offline screening may occur after the initial security screening or in parallel with the initial security screening.

After completing the additional security screening, a security screening system, which may take the form of a computing system, may make one or more determinations based on any of a variety of security-related conditions. For instance, if a security screening system may determine that a known class of item, such as an item that may be suspicious, meets a given screening condition, is contraband or prohibited. As another example of a security-related condition, a security screening system may determine that an item belongs to a class of items that are deemed to be safe. As still another example, a security screening system may determine that an object cannot be successfully identified. These security-related conditions may take various other forms as well.

Responsive to detecting an item that meets a given security-related condition, the security screening system may generate an output notification in some cases. In some examples, an output notification may be generated and/or transmitted to various personnel, such as customs or transportation security officers. These personnel could be alerted before the object arrives at its destination. The above are just some instances of a security screening system as described herein. Such a security screening system may take various other forms as well, which are described in greater detail below.

In one aspect of this disclosure involves a method. The method may comprise: performing an initial security screening on an object based on a first set of security-related data associated with the object and a first set of security screening parameters, performing a supplemental security screening on the object based on a second set of security-related data associated with the object and a second set of security screening parameters, wherein the first set of security-related data is different from the second set of security-related data, and wherein the first set of security screening parameters is different from the second set of security screening parameters.

Another aspect of this disclosure involves a computing device comprising a memory at least one processor, and a non-transitory computer-readable storage medium storing instructions that, when executed, cause the at least one processor to perform functions comprising: performing an initial security screening on an object based on a first set of security-related data associated with the object and a first set of security screening parameters, performing a supplemental security screening on the object based on a second set of security-related data associated with the object and a second set of security screening parameters, wherein the first set of security-related data is different from the second set of security-related data, and wherein the first set of security screening parameters is different from the second set of security screening parameters.

Yet another aspect of this disclosure involves a non-transitory computer-readable storage medium comprising instructions stored thereon that, when executed, cause at least one processor to perform functions comprising: performing an initial security screening on an object based on a first set of security-related data associated with the object and a first set of security screening parameters, performing a supplemental security screening on the object based on a second set of security-related data associated with the object and a second set of security screening parameters, wherein the first set of security-related data is different from the second set of security-related data, and wherein the first set of security screening parameters is different from the second set of security screening parameters.

Various other aspects of this disclosure may take various other forms as well.

I. System Overview

Turning now to FIG. 1, FIG. 1 illustrates a conceptual diagram of a computing system 100. At a high level, computing system 100 comprises a first security checkpoint 102, a security screening system 108, and optionally, a second security checkpoint 116.

At a high level, computing system 100 may be configured to perform a security screening process, which analyzes a given object and makes determinations about the object, such as whether an output should be generated that is related to the object. As some examples, security screening process may be used to make determinations about the object such as whether the object or any items contained therein should be permitted to pass through a source security checkpoint (e.g. first security checkpoint 102), and onto a destination (e.g. second security checkpoint 116), and/or should be flagged as violating or meeting certain security conditions. If any of the actions should be taken, the computing system 100 may generate an output. The output may indicate data related to the determination.

In an implementation, computer system 100 may comprise a first security checkpoint 102 and a second security checkpoint 116. First security checkpoint 102 and second security checkpoint 116 may be located an airport, bus terminal, sports stadium, transit terminal, office building, shipping depot, or any other environment where security screenings of objects may be performed. First security checkpoint 102 and second security checkpoint 116 may be locations at which objects undergo a security screening by one or more human and/or automated screening systems. These systems may then make determinations about the screened objects, such as whether objects pose security risks, should be subject to further inspection, etc.

One or more detection device 104 may be located at first security checkpoint 102 and second security checkpoint 116. Examples of such security screening devices 104 may comprise devices such as: a metal detector, MRI scanner, CT scanner, millimeter wave scanner, X-ray machine, or any other type of scanning system developed in the future.

As part of the security screening process, objects entering first security checkpoint 102 may be scanned by detection devices 104. For instance, as part of scanning an object, detection devices 104, may generate one or more images of a given object being scanned. The data generated by detection devices 104 may take various forms, such as two-dimensional or multi-dimensional image data. Such multi-dimensional data may comprise multi-spectral image band data, which may indicate various material and/or spectral characteristics of the object and/or any items within that object that have been scanned by a given detection device. In some examples, the image data may take the format of A DICOS ("Digital Imaging and Communication for Security" standard published by the National Electrical Manufacturers Association) image format or similar image format in which information such as atomic number, atomic density, and one or more spectral responses may be associated with one or more pixels of a 2D or 3D image.

Additionally, an object may interact with various people, processes, and/or system that may generate data that may then be associated with the object. As some examples, while at first security checkpoint 102, a given object passing may interact with various computing devices, personnel, and the like. These interactions may generate data and metadata that may be associated with the object. This data and metadata may be generally referred to as "security-related data." This security-related data may take various forms.

As some examples, a person may interact with various kiosks to check-in to a given mode of transportation. In another example, an object such as baggage may interact with personnel for a transport company to check or load the baggage on to a mode of transportation (e.g. an airplane bus, boat, etc.). As yet some other examples, a person may make various declarations about objects that they are shipping and these declarations may form metadata associated with the objects. As some further examples, first security checkpoint 102 may generate association data between (1) a passenger's baggage and the passenger, or (2) the traveler, his/her baggage, and the passenger's itinerary. This security-related data may take various other forms as well.

II. Security Screening

As mentioned above, computing system 100 may be configured to perform one or more security screenings on one or more objects and to make a determination about the one or more objects based on one or more of the security screenings. Security screening system 108 may comprise human screening system 114 and an automated screening system 112. Security screening system 108 may be illustrated as being separate from first security checkpoint 102 in example in FIG. 1. However, it should be further understood that security screening system 108 may be located at the same site as first security checkpoint 102, second security checkpoint 112, off-site (e.g. in a public or private cloud) or any combination thereof.

As described herein, security screening system 108 may be configured to employ various security screening techniques using human screening system 114 and/or automated screening system 112. A screening system 108 configured in accordance with embodiments of this disclosure may be configured to perform at least an initial security screening on an object and optionally at least one supplemental security screening of the given object, e.g. an object that enters first security checkpoint 102. Based on the initial and optional supplemental security screening(s), security screening system 108 may make various determinations about a given object based on data generated at or by first security checkpoint 102 for the given object.

A. Human Screening System

Turning now to human screening system 114, at a high level, human screening system 114 may involve various systems that enable a human, such as a screening operator, to screen a given object and/or data associated with that given object in order to make a determination about that object. Human screening system 114 may work in combination or separately with automated screening system 112 in various examples.

According to some embodiments, human screening system 114 may comprise at least in part a computing system having a display device, a memory, and one or more processors that is configured to display data received from first security checkpoint 102 in order to make determinations about a given object, such as whether an object is safe, should permitted through a security checkpoint, onto the object's destination, and/or meets any other security-related criterion. The security screening process carried out by human screening system 114 may take various forms.

In an implementation, human screening system 114 may a computing system that itself comprises a user-interactive system. Human screening system 114 may display captured image data of objects received from detection devices 104 to security screening officers. The screening officers in turn may review the captured image data to make determinations about the object and any items contained therein.

In an example, human screening system 114 may emphasize or highlight regions of a captured image which the machine learning system determines are likely to contain a known class of item. A screening officer may further inspect emphasized regions of the captured image and may make a determination of whether the emphasized regions represent items that are prohibited and may provide an indication, such as a user input of the determination. In another implementation, the security officer may analyze and make a determination of whether an image of an object contains a known class of item without the aid of automated screening system 112.

In some examples, images of object having classes of items that have been successfully classified by automated screening system 112 and/or human screening system 114, security screening system 108 may also search for the terms that may aid the screener in finding information about a potential threat.

For example, the human screening portion of human screening system 114 may comprise manual inspection of a given object, e.g. by screening personnel. Human screening system 114 may also involve analyzing or reviewing the output from one or more of detection devices 104 (e.g. reviewing security scan images, alerts generated by metal detectors, etc.), automated screening system 112 or various other computing systems. For instance, as part of the screening performed by human screening system 112, a security operator may review the output of an object detection system, an alarm generated by a metal detector, an alert generated by a security system. The screening of an object or its associated data performed by human screening system 114 may take various other forms as well.

Based on automated and/or manual review of a given object undergoing security screening, the security operator may make various determination about the object and its contents. For instance, a security officer at first security checkpoint 102 may analyze the captured image data to determine whether the images indicate the presence of any items that should not be permitted through the security checkpoint. Such items may be referred to herein as being "anomalous." If anomalous items are determined to be present, the screened object and its contents may be subjected to an in-depth manual search, which may result in a final determination of whether the object and/or its contents should be permitted to pass through first security checkpoint 102.

B. Automated Screening System

At a high level, automated screening system 112 may comprise at least one processor, a memory, and a networking interface configured to perform various security-related functions. More particularly, automated screening system 112 may be configured to analyze data generated by first security checkpoint 102 that may be associated with a given object undergoing a security screening and to make various determinations about an object undergoing the security screening. The screening and determinations may take various forms.

Such automated systems may comprise rules-based, artificial-intelligence-based, machine learning, machine vision, and/or deep learning-based, or various other techniques that can be used to automatically analyze objects passing through first security checkpoint 102. According to some more specific examples, automated screening system may comprise one or computing systems that may be configured to analyze data related to an object (e.g. image data of an object), and based on the screening, detect one or more classes of items from the data. Examples of such systems may comprise machine vision, machine learning, neural network, rules-based, support vector machine, or other types of computing systems now known or invented in the future.

In accordance with some implementations, the automated screening system 112 may comprise one or more neural networks, which may analyze image data e.g. from the at least one of security scanning devices 104. The neural networks may comprise an object detection deep learning system configured to analyze the image data to determine whether any known classes of items can be identified from the image. In one example, the automated screening system 112 may comprise at least one segmenter neural network, and at least one classifier neural network, as described in Synapse Technologies' U.S. patent application Ser. No. 15/800,609, filed on Nov. 1, 2017, and Ser. No. 15/714,940, filed on Sep. 25, 2017. The combination of the segmenter and classifier neural networks may be referred to as a "classification engine," the functions of which will now be described in greater detail.

To attempt to identify items represented within a given captured image, the classification engine first receives a captured image from one or more of the detection devices. The classification engine may then normalize the given captured image to produce a normalize image. Once the classification engine has generated a normalized image, the classification engine may utilize a segmenter which may be separate from or part of the classification engine to identify candidate bounding boxes comprising regions of pixels within the candidate image which may contain items for classification.

In some embodiments, the segmenter may analyze the features of a captured image using a neural network. In an implementation, the neural network may comprise a Region Proposal Network (RPN). The segmenter may generate score values that indicate a likelihood that a given region of the captured image contains and/or does not contain a given object. The segmenter may also define candidate bounding boxes that the segmenter determines may be likely to contain items. The segmenter may define a given candidate bounding box by generating position coordinates and dimension values for each bounding box.

In an example implementation, the RPN may comprise a set of layers. Shallower layers of the RPN may identify lower-level (e.g. simpler) features from a captured image, and deeper layers may identify higher-and-higher level (e.g. more complex) features from the captured image. Each layer may determine features from the output of the previous layer, and may transform the input representation to a different representation that encapsulates the higher-level detailed features. More particularly, the RPN may comprise a set of layers that alternate between "convolutional layers" and "pooling layers." A given convolutional layer of the RPN may receive a set of input pixels for processing, may apply a set of matrices referred to as "kernels" to the set of input pixels to generate a representation of the features identified form that set of pixels, referred to as a feature map. Each convolutional layer of the RPN may have a different associated set of kernels.

To apply a given kernel, in an example, the classification neural network may perform a process referred to as convolution, which takes a set of neighboring input values, which may comprise neighboring pixels or neighboring values of a feature map. The classification neural network expresses a given value from the set as a weighted sum of the value and its neighboring values in which the weights for each pixel are defined by the elements of the kernel matrices. The output of a convolutional layer is referred to as a "feature map" because the output contains information about features detected by the convolutional layer.

A pooling layer may selectively downsample values, e.g. pixels or values of a feature map, generated by a previous convolutional layer. More particularly, the pooling layer may determine a set of regions and may apply a pooling function, each of the regions. In an implementation, the pooling layer may apply a max-pool function to each region. The max-pool function may identify a maximum value from a given region, retain the maximum value, and may discard all other values in the region.

The RPN may first apply the convolution and pooling layers to a captured image to generate a "convolutional feature map." The convolutional feature map is effectively a downsampled multi-dimensional representation of features that the convolutional and pooling layers have identified by way of the convolutional and pooling processes performed at each layer.

After generating the convolution feature map, the segmenter may pass a set of anchor boxes having different sizes and aspect ratios, pixel-by-pixel, over each possible position of the convolutional feature map generated by the pooling and convolutional layers. The RPN applies a weight matrix to each combination of convolutional feature map position and anchor box to generate a vector for each feature map position-anchor box combination. The RPN uses classification layer and a regression layer to analyze each vector generated by the weight matrix. The classification layer generates values, referred to as probability scores, which indicate the probability that an object may or may not be present within the given region defined by the feature map position-anchor box combination.

The regression layer generates attempts to compute a position of a bounding box that closely bounds or contains any potential items that the RPN identified based on the feature map at the given anchor window-position combination. The regression layer outputs scores that indicate the position, width and height of a given bounding box.

To determine whether an item may be present within the region contained in a given anchor box and at a given position, the region proposal network may pass the vector for the anchor box-position combination generated by weight matrix through a classification layer, which may generate a score, referred to a position score value, for the given region. The position score value may indicate a likelihood that the region contains an item that may be classified. The score value, which may be referred to herein as a "position score value," associated with a given anchor box at a given position. As an example, a position score value may be between 0 and 1, inclusive.

Once the segmenter has generated scores for each position and anchor box, the classification engine may identify a set of candidate bounding boxes which have the highest position scores values. The segmenter may output the identified set of highest scoring candidate bounding boxes to a classifier, which may comprise a convolutional network, for further analysis to determine whether a given identified candidate bounding boxes may contain classifiable items.

The classifier attempts to classify a class of item to which the contents of the given candidate bounding box may belong. To attempt to categorize the contents of the given candidate bounding box, the classifier may identify features present within the pixels of the candidate bounding box, and may compare a similarity of those features to features present in a previously-determined set of classes of items which each class may represent an item or a set of items. The classification engine may express the similarity between the contents of a given candidate bounding box and a given class as a respective probability value. The set formed by combining all probability values for each of the set of classes may form a probability distribution.

More particularly, to identify a class of item contained within the pixels of a given candidate bounding box, the classification engine may receive a set of pixels of a candidate bounding box as input, and may resize, e.g. downsample the pixels of the given candidate bounding box to a standard size. After resizing the pixels of the given candidate bounding box, the classification engine may utilize a neural network of the classifier, referred to as a classification engine neural network, to identify a class of item which may categorize the standard-sized candidate bounding box.

The neural network of the classifier may comprise multiple layers. Shallower layers of the classification engine neural network may identify lower-level (e.g. simpler) features based on a given set of pixels, and deeper layers may identify higher-and-higher level (e.g. more complex) features. Each layer may determine features from the pixels of the resized candidate bounding box, and may transform the representation to a different representation that encapsulates the higher-level detailed features. More particularly, the classification engine neural network may comprise a set of layers that alternate between convolutional layers and pooling layers.

Each convolutional layer of the classification engine neural network may have a different associated set of kernel matrices, which the neural network may apply to a set of neighboring input values that are also represented as a matrix. To apply a given kernel, the classification neural network performs a convolution process on a set of neighboring input values, which may comprise a set of pixels or a set of values from a feature map. The convolution process which expresses a given value as a weighted sum of the value and its neighboring value in which the weights for each value are defined by the elements of the kernel matrices. As an example, one or more layers of the classification neural network may apply a modified Sobel kernel, which is a set of two 3×3 matrices that may be applied to sharpen the edges of a given set of values, e.g. pixels.

A pooling layer may selectively downsample regions of a feature map generated by a previous convolutional layer by determining a set of regions and applying a pooling function to each of the values in each region. One such example of a pooling function may comprise a max-pool function. The max-pool function may identify a maximum value from a given region, retain the maximum value, and may discard all other values in the region.

The classification engine neural network alternates between convolutional layers and pooling layers. Each subsequent convolutional layer applies its associated convolution to the output of the preceding pooling layer, and each pooling layer applies its associated pooling function to the output of the preceding convolutional layer. The classifier's neural network repeats this process of alternatively performing convolution and pooling until the classifier's neural network has performed the operation associated with each layer of the neural network. Based on the output of applying all the convolutional and pooling operations, the classifier neural network outputs a set of feature maps having reduced dimensionality, referred to as an embedding. An embedding may represent various features that the neural network has detected in the pixels of a given candidate bounding box.

The process of identifying candidate bounding boxes, with the segmenter, and classifying, by the classification engine, items within a given candidate bounding box is referred to as an execution phase. The execution phase performs computations using parameters that were defined before the execution phase in a training phase. Such parameters may include classes of items, kernel matrix weights, and the values of various matrices, During the training phase, the RPN and the classifier may input training data comprising images and metadata describing regions known to contain items, and known classes of items, which the RPN and classifier's neural network may analyze. By analyzing the training data images and corresponding metadata, the RPN "learns" features that distinguish the various items in the training data images. Based on the analysis of the training data that occurs during the training phase, the RPN and classification engine adjust and/or define parameters of the classification engine neural network, such as the kernel weights, weighting matrices, the classification matrix, and regression matrix. In an implementation, the RPN and classifier may adjust or define the various parameters based on a cost function. The RPN and classifier may various techniques, such as gradient descent techniques, to minimize the cost function for each of the parameters. Various other parameters may also be adjusted and/or defined during the training phase and in various other manners.

Once the classification engine has been sufficiently trained, the classification engine may detect the learned features in captured images to classify items in those images based on the learned features. It is worth noting that the data used to train the neural network may be captured using real objects and/or items, or synthetically generated.

After the classifier's neural network has generated the embedding, the classification neural network may apply a weight matrix to the embedding to map the embedding to a vector in an n-dimensional space. After the classifier applies the weight matrix, the classifier may apply a function to the n-dimensional vector resulting from the application of the weight matrix to generate a probability distribution that indicates between the pixels within a given candidate bounding box and the classes of items defined by the training data during the training phase. One such function that the classifier may apply to the n-dimensional vector may be a softmax function, which generates a probability distribution comprising a set of probability values that are all between zero and one, and which have a sum total equal to one.

The probability distribution may comprise a set of confidence values. Each given confidence value from the set indicates a similarity between the embedding generated for the given candidate bounding box and a respective class of item. Thus, the probability distribution comprises confidence values that indicate respective likelihoods that the embedding for a given candidate bounding box is correctly classified as a given class of item.

Once the classifier has determined a probability distribution for a given candidate bounding box, the classifier determines whether any of the confidence values in the distribution exceed a given threshold value, e.g. 0.95. If a probability for a given candidate bounding box exceeds the threshold value, the classification engine may classify the candidate bounding box as the class of item that meets the threshold probability, thereby identifying the candidate bounding box as the class of item.

Once a candidate bounding box has been classified as containing a given class of item, i.e. has been identified as a given class of item, the classification engine may send information about the given class of item to a policy engine. Based on an inputted class of item, the policy engine may access and output policy information related to the inputted class of item. The policy information may comprise information such as security-related information (e.g. whether an item is safe or unsafe) or threat information (e.g. whether an item is a threat and how much of a threat a given item poses), etc.

The process of performing a security screening for a given object may involve security screening system 108 performing an initial security screening phase and optionally one or more supplemental security screening phases. An overview of the security screening process will now be described in greater detail.

C. Security Screening Overview

As described herein, during the security screening process, security screening system 108 may perform an initial security screening by analyzing data associated with a given object using automated screening system 112 and/or human screening system 114. Based on the output of that screening, security screening system 108 may make one or more determinations which may result in generating one or more outputs. Such security screening may take various forms.

As some examples, security screening system 108 may analyze objects and their associated security-related data, (e.g. data generated by first security checkpoint 102) to make various determinations about the security-related data. In some instances, and based on the determination, security screening system 108 may generate one or more outputs. Such determinations and outputs may take various forms examples of which will now be described in greater detail.

As a first example, automated screening system 112 may analyze image data generated by detection devices 104 to determine whether any known classes of items can be identified from image data of an item. Based on the screening, the object detection system may make various determinations about the classes of identified items. Such determinations may, for example, involve determining whether any of the identified items are, e.g.: hazardous items, non-hazardous items, components that can be used to form an item, items known to comprise safe items, as some non-limiting examples. The determinations about identified classes of items may take various other forms as well.

In some examples, an object detection system may be configured to identify known classes of items based on a given object detection confidence value. The confidence value may indicate a likelihood that a given object has been classified correctly by the object detection system. Higher confidence values may indicate a greater likelihood that the item has been correctly classified as belonging to a given class of item. The object detection system may only indicate that a given class of item has been classified correctly if the confidence value has been met or exceeded. This confidence value may indicate the confidence that the automated screening system 112 system has correctly identified a given class of item from one or more captured images. Further, this confidence threshold may be configurable in various manners (e.g. by systems administrators by security screening personnel, etc.).

Additionally and/or alternatively, the security screening system 108 may analyze security-related data associated with an object to make determinations about that object. As some examples, the data screening may involve analyzing data, such as an object's itinerary (e.g. source and/or destination), customs and border control protocols, known traveler lists, customs declarations, etc. The security screening may take various other forms as well.

As part of undergoing the screening process, object passing through first security checkpoint 102 may generate data, which security screening system 108 may store for later use. The stored image data may be stored locally on the detection devices or on a computing system, such as security screening system 108, or on some external storage. For example, when an object passes through one or more of detection devices 104, detection devices 104 may generate image data of the object, and security screening system 108 may store captured image data of the object. As another example, various systems may generate security-related for an object undergoing security screening, which security screening security screening system 108 may store. In some instances, the stored data may be discarded after some period or condition(s) are met, e.g. after an object has completed the security screening process.

D. Security Screening Examples

Some more particular examples will now be described. In one example objects such as passengers and/or baggage may be scanned by detection devices 104. These detection devices may generate various types of data and metadata, which may be associated with the object. In some cases, this data may be converted to a format that is more readily interpretable by human beings and screening systems. For instance, images of baggage may be generated by a detection device, such as a baggage scanner, and converted to a 2D representation that may represent the contents of the baggage. The 2D representation may be displayed for screening analysis by security personnel as part of human screening system 114. As another example, an image generated by a scanning device may be output to automated screening system 112 for analysis. Automated screening system 112 may comprise object detection systems, which may be configured to attempt to determine the presence of various classes of items from the images generated by detection devices 104.

According to various implementations, upon detecting a given class of item that the object detection system has been configured to detect, the object detection system may be configured to generate an output. Such an output may take various forms including an alert, a visual output, etc. The visual outputs may be sent to security screening personnel for further review (e.g. so that the personnel may re-scan the bag or manually inspect the bag, etc.). In some examples, the visual alerts may point out specific areas within the bag where the detection system believes the detected objects are supposed to be present. Alerts may likewise be sent to security personnel for similar purposes, e.g. to alert the personnel about an issue with a bag. The alerts and visual outputs may take various other forms as well.

In yet further instances, security scanning devices 104 and/or security officers at first security checkpoint 102 may analyze the captured image data to determine whether the images of an object indicate the presence of any items that should not be permitted through the security checkpoint or at a destination. (e.g. if an item is determined to be anomalous). If anomalous items are determined to be present, the object and/or a person associated with the object may be subjected to a more in-depth security screening (such as a manual search), e.g. by security personnel, which may result in a final determination of whether any of the detected items are anomalous, whether the person and/or item should be permitted through the first security checkpoint 102, etc.

As described above, security screening system 108 consists of an initial security screening phase and one or more optional supplemental security screening phases. In general, the initial security screening and supplemental screening may take the general form of the security screening techniques described above. That is, both the initial security screening phase and supplemental security screening phase may be performed by human screening system 114 and/or automated screening system 112 to analyze an object, make one or more determinations about the object, and generate one or more outputs related to the object. The initial security screening phase will now be described in greater detail E. Initial Security Screening During the initial security screening, an object undergoes screening by security screening system 108 using a first set of security-related data associated with the object and based using a first set of security screening parameters. The first set of security-related data and screening parameters may take various forms and may be determined based on various factors and constraints.

For instance, a given object may begin the initial screening at a first time. At this first time, one or more images of the object may be captured and analyzed by security screening system 108. Further, there may be a first set of security-related data available to security screening system 108 for analysis. Such data may include, e.g. an object's destination. Security screening system 108 may perform the initial security screening using an initial set of security screening parameters. As some examples, these initial screening parameters may comprise object detection confidence thresholds, maximum object detection times, etc.

These screening parameters may be defined based on a variety of factors. For instance, the object detection algorithm used in the initial security analysis may have various object detection thresholds that are tuned based on an expected number of passengers at a given time of day, based on threats expected at a given location, based on a given threat level, etc.

In some cases, these security screening parameters for object detection may be adjusted based on output generated by a different one of detection devices 104. For instance, if a metal detector or CT scanner alerts when scanning a given person, the scrutiny for performing object detection on the person's baggage may be increased (e.g. by lowering object detection thresholds used to perform object detection).

According to some further examples, the parameters initial security screening may be configured to perform rules-based analysis of various combinations of data generated by multiple detection devices 104 to set the screening parameters. For instance, the initial security screening may determine which of a metal detector or a human body scanner is set off first.

An ideal initial security screening would consider all security-related data that would ever be generated for a given object and would use security screening parameters that would produce extremely accurate object classification. However, such an ideal initial security screening may not be possible for a variety of reasons. As one example, the initial security screening may be subject to various time constraints that may prevent a desired accuracy of the initial security screening.

Thus, according to some examples, an initial security screening in accordance with this disclosure may be configured to perform screening of objects to occur such that a given scanning accuracy and/or screening speed are met.

Those criteria might take the form of a maximum rate of false positive item detections, or a minimum amount of throughput expressed in objects scanned within a given period of time, as some examples. Such criteria might be specified based on parameters that control the operation of automated screening system 112, e.g. various object confidence detection thresholds, etc.

Further, the initial screening may ideally analyze various security-related data associated with an object. However, as mentioned herein, there may be a number of issues with the initial security screening process and performing as thorough and/or accurate security screening as is desirable.

For example, if the parameters of the object detection system used in the initial security screening produce too many false positives, too many objects could be unnecessarily flagged for deeper analysis which could in turn lower throughput of objects through the security checkpoint. Second, if the parameters used by the object detection initial system are incorrectly tuned, the initial security screening may take an unacceptably long period of time to perform such that the overall scanning throughput of objects scanned at the security checkpoint through the security checkpoint would take an unacceptably long amount of time, which may cause backups and/or delays at first security checkpoint 102. Further, the maximum desired throughput and/or maximum acceptable delay through the security checkpoint may be variable based on time of day, number of objects passing through the security checkpoint, security threat level, etc.

As another example, circumstances may change at a security checkpoint, which may result in a need to change screening parameters. Examples of such changing circumstances may include, e.g. an increased threat level, an increase in objects that need to be scanned in a given period of time, changing threat priorities, and other factors. As a result of these changing circumstances, one or more of security screening parameters, such as object detection thresholds may need to be changed. As a more specific example, due to an increased number of passengers passing through a given security checkpoint during a busy time of day, object detection thresholds may need to be increased (i.e. so that a high level of confidence is required to identify a given item). As yet another example, due to an increase in a given type of weapon at a security checkpoint, such as brass knuckles or knives, the object detection thresholds for the given type of weapon may need to be lowered so as to detect a greater percentage of these weapons. The thresholds may be changed for various other reasons as well. In still a further example, the object detection thresholds may be automatically adjusted to ensure a given rate of object detection false positives.

Yet another issue is that that security-related data associated with an object may not be immediately available at the time the initial security screening begins and/or cannot be analyzed during the initial security screening system without causing significant delay of the screening of objects through first security checkpoint 102. As a more particular example, first security checkpoint 102 may not generally be in communication with second security checkpoint 116 but there may be a need for the automated screening system 112 to have some level of knowledge about the security requirements of another security checkpoints. For example, objects (including passengers) may have departure, arrival, and even intermediate destinations each of which may have different security checkpoints which, in turn, have different security requirements for permitting passage of objects through those respective security checkpoints. There are several difficulties with different security checkpoints having differing security requirements.

To illustrate these difficulties, consider a passenger travelling with baggage from a first country (e.g. the USA) to a second country (e.g. France). Each country may have different requirements for allowing objects through customs. For instance, certain classes of objects may be considered dangerous in one country but not in another (e.g. lighters). Customs in each country may also permit different maximum quantities of a certain class of object (e.g. alcohol, tobacco, cash, etc.) when entering or exiting the country. It may be the case that the security screening system 108 may initially only have access to certain security-related data, such as customs requirements, of that given security checkpoint (e.g. a source security checkpoint) but not the customs requirements of the destination security checkpoint. However, the security processing system may only gain access to the destination customs metadata after the object has been cleared by the source security checkpoint.

F. Supplemental Security Screening

To address the aforementioned issues, the security screening process may include one or more supplemental security screening phases, which may occur before, during after, or partially parallel with the initial security screening. By enabling the security screening system 108 to perform such supplemental screening, the security screening system can respond to changing conditions, such as changes in volume through the security checkpoint, can perform more detailed screening if required, and can perform processing based on data associated with an object that is received at such a time that would make real-time processing of the data impossible or would add undue delay.

The supplemental security screening may generally be similar to the initial security screening. However, the supplemental security screening may allow security screening system 108 to perform different, more detailed, and/or more accurate security screening of a given object thereby improving the accuracy and/or quality of the security screening process. The supplemental security screening may take various different forms.

One form of such supplemental security screening may be re-screening, in which further screening is performed on a given object and its associated stored security-related that previously underwent an initial security screening data but with some form of variation relative to the initial security screening. One form of supplemental screening may involve re-analyzing data that was previously-analyzed during the initial security screening using a different set of security parameters. For instance, if one or more images of a given object were analyzed with a first set of parameters in an initial screening, automated screening system 112 may re-analyze the set of images with a second set of different parameters. These parameters may have been changed for any of a variety of reasons, as described herein. For instance, an increase in the number of objects that need to pass through the checkpoint in real-time. The re-screening process may then involve adjusting various parameters to perform a more in-depth object detection process that may take longer to perform. Such additional analysis may occur during or after the object has passed through first security checkpoint 102 or even while the object is in-transit.

In some instances, the re-screening process may be performed by a computing system that has additional resources or can perform re-screening in a faster manner than the system that performed the original analysis. As another example, the re-screening computer system may use different algorithms to analyze and identify items from the captured image data, such as algorithms having higher computational complexity and which would have further delayed passengers or other items time employed to analyze captured image data at first security checkpoint 102. In another implementation, the re-screening may use different neural network structures, e.g. structures that have slower performance but higher classification accuracy. In yet another implementation, the re-screening may involve utilizing different machine learning techniques and/or algorithms, such as a support vector machine (SVM), or any other machine learning image classification system now known or known in the future to classify items from the previously-captured data or using newly-captured data to classify the items. In yet a further implementation, security screening 108 may use neural nets that are trained to identify different sets of items than those used at first security checkpoint 102. The re-screening computing system, e.g. security screening 108 may perform any of these various combinations of techniques as well.

Another form of supplemental security screening may involve analyzing data after the initial security screening has begun based on additional data, which may not have been able to have been considered by automated screening system 112 while still providing sufficient screening throughput of objects through first security checkpoint 102.

Alternatively, the automated screening system 112 may have determined second set of screening parameters based on security-related data, such as a traveler's destination and the security-related data, such as criteria (e.g. customs) associated therewith, which was not available during the initial security screening. In this example, automated screening system 112 may consider the newly-available customs information, and if the automated screening system 112 determines that a security-related rule has been violated, security screening 108 may generate and/or transmit an output notification at the second security checkpoint, e.g. second security checkpoint 116.

As a more particular example of this border/customs checking that may occur as part of the supplemental security analysis, a traveler may be traveling from the US to the UK, each of which have different customs and border protocols. These protocols may differ in various manners. As one example, first security checkpoint 102 and second security checkpoint 112 may have a different: (1) no-fly lists, (2) limits on goods that can be brought into the country, (3) security threat levels (e.g. terror threat levels, (4) lists of prohibited goods, (5) objects for which heightened scanning scrutiny should be applied, relative to a second different country, and the like. The customs/border protocols between two countries may vary in other manners as well.

During the supplemental security analysis, security screening system 108 may receive obtain the traveler's itinerary from first security checkpoint 102, identify the traveler's origin destination, and determine customs and/or border checking protocols based on a database or requesting data from first security checkpoint 102 and/or second security checkpoint 116. In turn, security screening system 108 may re-screen captured image data from at least one security scanning devices 104, to determine whether the traveler's person and/or belongings, such as baggage, laptop, etc., are anomalous, e.g. whether the person and belongings meet both sets of border/customs protocols.

F. Configuration of Security Screening System 108

One feature that security screening system 108 may support is configuration or reconfiguration of security screening system 108. Security screening system 108 may be configured and reconfigured in various manners. As some examples, security system 108 may be configured to define whether security screening system 108 should permit various classes of items to pass through a given security checkpoint.

Security screening system 108 may be configured by various different security authorities. Examples of such authorities may include security screening personnel, governmental agencies such as the US Transportation Security Administration (TSA) such as border patrol and customs agencies. Security screening system 108 may be configured by various other authorities as well.

As an example, of an authority configuring security screening 108, U.S. customs and border control may configure security screening system 108 to analyze baggage on US-inbound planes should for customs violations (e.g., excessive amounts of items, such as baggage having greater than a threshold number of iPhones, computers, etc.). As another example, the TSA may configure security screening 108 to analyze objects for terrorist threats such as iPhone or laptop bomb threats.

According to these implementations, there may also be a second authority, which may also specify may also limit the granularity of the search. For example, one authority may be interested in searching for any phone, whereas the second security authority may only want to search for Samsung Galaxy S7 phones.

According to these implementations, an authority may also set a default search granularity setting. For instance, a given security authority may set a default granularity to "everything," which, if set, may cause security screening system 108 to identify all items and anomalies that it can successfully classify using all possible taxonomies and granularities. It should be understood that limiting or broadening the search granularity may increase or decrease the amount of time that security screening system 108 takes to classify the items from scanned image data.

In some implementations, automated screening system 112 may also be configured to attempt to identify previously unknown classes of items. Automated screening system 112 may perform this function in various manners.

According to one implementation, machine learning system may determine, from a captured screening image, a region of the image that is likely to contain the item, but which the automated screening system 112 cannot classify as a known item type. Responsive to determining that a region cannot be classified as an item, automated screening system 112 may attempt to identify the unknown item by searching through an image archive for similar objects that have been analyzed in the past. Then, for these certain objects that automated screening system 112 is able to classify by virtue of these objects having been analyzed in the past, automated screening system 112 may recall the decision made for that object (e.g. "threat" or "no threat") to aid the human decision-making process. Automated screening system 112 may also apply such classifications to similar images or items and make an anomaly recommendation for the previously-unclassifiable items (e.g., "bags most similar to this are often cleared.")

III. Output Generation

After conducting an initial or supplemental security screening, that a given object that has undergone initial and/or supplemental security screening, the security screening system 108 may generate an output (such as a notification), for example depending on whether a condition has been met. In some examples, the generated output may comprise may generating a notification. Generating a notification may take various forms.

At a high level, the notification may be generated according to the various security protocols determined by security screening system 108, e.g. based on protocols of first security checkpoint 102 and/or second security checkpoint 108. For instance, a notification may be generated if security screening system 108 determines that an identified object contains one or more items that exceeds a threshold (e.g. more than a threshold number of items or the size of an item is greater than a threshold size). As another instance, a notification may be generated if a given type of situation occurs, such as automated screening system 112 identifying a dangerous and/or threatening item, identifying a customs violation, identifying a bag that belongs to a certain passenger posing a high security risk.

As yet a further example, security screening system 108 may be configured to generate an output if certain search parameters have been satisfied. As examples, search parameters may comprise: (1) a threshold number of items being identified, (2), an item exceeding a threshold size, as some non-limiting examples.

The outputs (such as notifications) generated by security screening system 108 may comprise various data. In some implementations, a notification may comprise information about an item that was identified. One example of such identified item information may comprise threat information. Threat information may indicate whether a given identified class of item is a threat, a location of the identified class of item (e.g., a vessel or other location of the item, the location in a particular piece of baggage, etc.), and/or a detailed description of why the identified item is or is not a threat, as some non-limiting examples. The threat information may take various other forms as well.

As another example, a given notification may also comprise information related to a traveler. Examples of information related to a traveler may include information such as the traveler's identification information (e.g. passport number, name, address, country of origin, etc.), destination (e.g., vessel, arrival time, etc.), a list of countries the traveler has recently visited. As yet another example a given notification may also comprise bag information, e.g. a bag's shape, size, security tagging information (e.g. barcodes QR codes, etc.). As still another example, the notification may comprise metadata related to the analysis, such as the time of analysis, location, search results, officer on-duty, as some non-limiting examples. The notification may comprise other information as well.

According to some implementations, the notification may be sent to another security checkpoint, such as second security checkpoint 116. A notification may be sent to second security checkpoint 116 in various manners. As one example, these notifications may be sent using an application programming interface (API), such as a REST (representational state transfer) API. These notifications may be transferred in various other manners and using various other messaging techniques as well.

Upon receiving the notification, second security checkpoint 116 may send output the received notification to one or more security personnel. These security personnel may then take various actions, such as engaging in a further screening of an object/traveler that poses a security risk, or various other actions.

According to still another implementation, security screening system 108 may transmit a generated notification to another computer system or application. This application may be configured to follow protocols to follow up on reported threats. As one example, if a gun is detected, security screening system 108 may be configured to alert police. As another example, if there is a customs issue, such an excessive quantity of a given item (e.g. too many cigarettes, alcohol, etc.), customs officials may be alerted. Various other examples are possible as well.

According to yet another implementation, security screening system 108 may be configured not to send a notification to another computer system even though the notification has been generated. As an example, security screening system 108 may be configured not to send an alert based on a set of security protocols established by various security authorities. For example, the system may be programmed to detect lighters, but ignore them in certain jurisdictions (for example, the security screening system 108 may ignore a lighter in a Japanese security checkpoint where having a lighter in a bag may be permitted).

Security screening system 108 may be configured to archive some or all of these notifications. This archived notification data may be combined with data from analysis results in the past and from other locations into a central or local database. The archived notifications may then be stored in a database, which may be indexed and searchable.

For instance, different jurisdictions may compare the frequency of different threats occurring. As one example, the United States could define security policies and screening strictness based on the types of objects (e.g. hazardous or non-hazardous) seen originating from certain countries. In turn, TSA Global operations could use these results to audit the security of inbound flights. Further, global aviation security stakeholders could analyze this data (e.g. threat frequency, audits, etc.) to measure how certain travel item bans would impact certain regions or airports.

VI. Examples

Various examples of security screenings as performed by computing system 100 and security screening system 108 will now be described.

As a first example, a traveler may deposit a bag at first security checkpoint 102. In this example, the first security checkpoint 102 may be located at an office building. At first checkpoint 102, the bag may pass through a detection device, such as X-ray machine. The bag undergoes an initial security screening which does not uncover anything unusual. After the X-ray machine scans the bag, security screening system 108 may further analyzes the bag as part of performing a supplemental security screening to determine whether there are any issues posed by the bag, such as security threats. If security screening system 108 determines there are threats, security screening system 108 may automatically alert a local security operator or other personnel at first security checkpoint 102.

As a second example, a bag may be scanned at least one of detection devices 104 at first security checkpoint 102. First security checkpoint 102 may be located at an international airport in this example, such as London Heathrow, and may be headed into New York's JFK airport. The image is scanned under US standards during an initial security screening. Then, after a bag is loaded onto the plane and while the airplane is in the air, a supplemental security screening is conducted, which detects an item that is prohibited in the U.S. In response to detecting the prohibited item, and U.S. Customs and Border Patrol and/or the TSA may be alerted to the prohibited item. If the security screening system is connected to a passenger identification or ticketing system, the authorities could be notified about exactly which passenger was responsible for bringing the prohibited item, and the responsible passenger could be questioned or detained by authorities.

As a third example, objects may travel from a first a first departure point through a second intermediary destination, such as a connecting airport, on their way to a final destination, such as another airport. At the departure point, the objects may be subject to an initial security screening that complies with the security, customs, and/or border protocols of the departure point and intermediate destinations, and while the objects are traveling to the intermediate destination, the object may undergo a supplemental security screening that complies with security, customs, and/or border protocols of the final destination.

As a more particular instance of the aforementioned third example, passengers may travel from Greece on a flight from Greece to the US that connects through Paris, France. At a security checkpoint in Greece, objects such as passengers and baggage may be screened by Greek security subject to an initial security screening using security protocols that are acceptable to Greek security as well as to Paris/French security. Further, after the initial security screening begins (e.g. while in-air), some or all of the objects may undergo a supplemental security screening to comply with the security protocols of the destination, i.e. US security, border control, customs, etc. Such a supplemental screening may be further used to determine if further screening is needed for particular passengers. Such a supplemental screening would likely have stricter (i.e. lower) object detection thresholds than the initial security screening.

As a fourth example, certain security authorities may be designated to look for security concerns in their purview, and a security screening system may be configured to perform security screenings for the concerns of a given security authority. For instance, in the US, the TSA may only look for security concerns, i.e. not for illicit drugs, currency, or other customs violations. In such a case, security screening 108 may be configured to perform an initial security screening that may disable object detection (i.e. have no detection threshold or an infinitely high threshold) for those items that are not a given agency's concern (e.g. cash and drugs), whereas the security screening unit 108 may be configured to perform a supplemental security screening that may perform object detection for classes of objects that are outside of the agency's concern such as cash or drugs in the aforementioned example.

As a fifth example, a security screening may be configured to output a notification to another agency. For instance, an initial security screening which may be conducted by the TSA may determine that a person of interest has passed through an initial security checkpoint as part of performing an initial security screening. However, the TSA may lack specific information related to how to conduct a security screening on that person of interest (e.g. what classes of items the person and/or the person's belongings should be searched for) but another security authority, such as Interpol, may have information regarding how to conduct the security screening. In such cases where the person of interest passes through a security checkpoint, security screening system 108 may output a notification to Interpol regarding the person of interest so that Interpol may conduct a follow-up screening on the person of interest.

As a sixth example, security screening system 108 may perform a supplemental security analysis based on the type of and/or speed with which an initial security analysis can be performed. For example, a passenger may pass through a CT scanner. However, analyzing images generated by the CT scanning process may take an excessively long period of time. In such cases where an initial image takes an excessively long period to analyze, only human analysis of the CT image(s) may be performed during an initial security screening, and the passenger may be permitted to pass through the security checkpoint onto his/her destination. After the passenger passes through the checkpoint, the CT images may be analyzed in a more in-depth security screening by automated security system 112 as part of a supplemental security screening.

As a seventh example, in a case where supplemental security screenings take a great deal of resources, a supplemental security screening may be performed based on whether an initial security screening determines that a supplemental screening is warranted. The initial security screening may select or tailor a supplemental security screening based on a traveler's identity. For example, if the initial security screening determines that a traveler is an engineer, a supplemental security screening may be selected, tailored, created, etc., to fit the profile of a traveler who is an engineer.

VII. Example Flow Diagram

Figure 2:
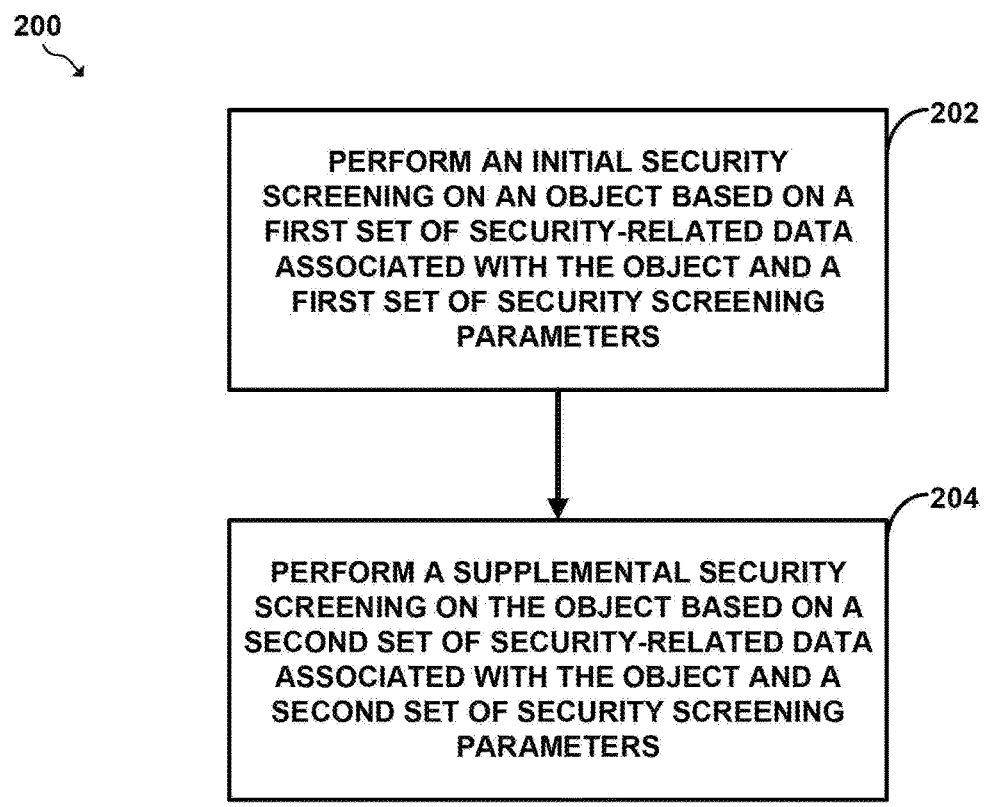
FIG. 2 is a flow diagram illustrating example techniques performing initial and supplemental security screenings in accordance with this disclosure.

FIG. 2 is a flow diagram illustrating an example method for performing initial and supplemental security screenings in accordance with this disclosure. FIG. 2 illustrates a method 200. Method 200 may be implemented as a method which may be executed by at least one processor, To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

By way of example, method 100 of FIG. 2 may be executed by security screening system 108 of computing system 100 illustrated FIG. 1. Security screening system 108 may be implemented in hardware, software, microcode, firmware, on an application-specific integrated circuit (ASIC), read-only memory (ROM), graphics processing units (GPUs), field-programmable gate arrays (FPGAs) or any combination thereof. Security screening system 108 may comprise at least one processor, a memory and a non-transitory computer-readable medium comprising instructions. The instructions may be executable to perform the functions described in the method of FIG. 2. The method of FIG. 2 may be implemented in various other forms as well.

At block 202, security screening system 108 may perform an initial security screening on an object based on a first set of security-related data associated with the object and a first set of security screening parameters. In some examples, security screening system 108 may receive at least one image of the object from a detection device.

At block 204, security screening system 108 may perform a supplemental security screening on the object based on a second set of security-related data associated with the object and a second set of security screening parameters. Either the initial security screening or the supplemental security screening may be performed based on the at least one image of the object. Further, it should be understood that the second set of security screening parameters may not have been available during the initial security screening in some cases. In some cases, performing the initial security screening and the supplemental security screening may comprise performing one or more of: (1) human analysis of an image of the object or (2) automated analysis on the image of the image object.

It should be understood that the first set of security-related data may be different from the second set of security-related data, and that the first set of security screening parameters is different from the second set of security screening parameters. In various instances, the performing supplemental security screening may comprise performing at least one of: a more detailed security screening on the object or performing a security screening on the object that takes a longer period of time than the initial security screening. In some examples, a first algorithm may be used to perform the initial security screening on the object, and a second, different algorithm is used to perform the supplemental security screening on the object.

In some examples, performing either the initial security screening or the supplemental security screening may comprise performing object classification on at least one image of the object to determine whether a class of item can be identified from the at least one image of the object. In such examples, the first and second set of security screening parameters comprise an object detection confidence level upon which the object classification is based.

In some cases, the security-related parameters may change. As an example, if it is determined that a security-related condition has changed, at least one of the first security screening parameters or the second set of security screening parameters may be changed based on the determination that the security-related condition has changed. Such a security-related condition may comprise at least one of: an increase in object screening throughput, a change in a security threat level, or a change in a class of object to be detected, as some examples. As another example, if it is determined that determining that a false positive rate for performing object detection has changed, based on the determination that the false positive rate has changed, an object detection confidence level for the object detection may be adjusted.

In various examples, security screening system 108 may generate an output notification. For instance, according to various embodiments, the object may undergo the initial security screening at a departure security checkpoint and may travel to an arrival location. In such embodiments, security screening system 108 may determine, based on the supplemental security screening, whether the object violates a condition that may comprise at least one of a customs-related condition or a security-related condition. After determining that the object violates the condition, the security screening 108 may generate an output notification for a person at the arrival location, wherein the output notification indicates the violated condition. In other examples, security screening system 108 may determine, as a result of the initial security screening and the supplemental security screening, that an image of the object contains an item known not to pose a security threat. After determining that the image contains the item known not to pose the security threat, security screening system 108 may generate an output notification indicating that the object contains the item known not to pose the security threat.

According to various embodiments, the security screening system 108 may generate an output notification. For instance, if security system 108 determines, as a result of the initial security screening and the supplemental security screening, that an image of the object contains an item known not to pose a security threat, then after determining that the image contains the item known not to pose the security threat, security screening system 108 may generate an output notification indicating that the object contains the item known not to pose the security threat.

III. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

What is claimed is:

1. A computing system comprising:
   at least one processor; and
   a non-transitory computer-readable storage medium comprising instructions stored thereon that, when executed by the at least one processor, cause the computing system to:
   perform an initial security screening on an object based on (i) a first set of security-related data associated with the object comprising first image data corresponding to a first scan of the object by a detection device communicatively coupled to the computing system and (ii) a first set of security screening parameters, wherein performing the initial security screening comprises:
   based on the first image data, executing a neural network in accordance with the first set of security screening parameters; and
   based on executing the neural network in accordance with the first set of security screening parameters, generating a first security determination for the object;
   perform a supplemental security screening on the object based on (i) a second set of security-related data associated with the object comprising at least one of (a) the first image data or (b) second image data corresponding to a second scan of the object and iii) a second set of security screening parameters, wherein performing the supplemental security screening comprises:
   based on at least one of (a) the first image data or (b) the second image data, executing a neural network in accordance with the second set of security screening parameters; and
   based on executing the neural network in accordance with the second set of security screening parameters, generating a second security determination for the object; and
   provide to a computing device an output notification based on at least one of (i) the first security determination or (ii) the second security determination; and
   wherein the first set of security-related data is different from the second set of security-related data, and wherein the first set of security screening parameters is different from the second set of security screening parameters.

2. The computing system of claim 1, wherein performing the initial security screening further comprises, based on executing the neural network in accordance with the first set of security screening parameters, performing object detection on the first image data to determine whether a class of item can be identified from the first image data, and wherein performing the supplemental security screening further comprises, based on executing the neural network in accordance with the second set of security screening parameters, performing object detection on the at least one of the first image data or the second image data to determine whether a class of item can be identified from the at least one of the first image data or the second image data.

3. The computing system of claim 2, wherein the first and second set of security screening parameters comprise an object detection confidence level upon which the object detection is based.

4. The computing system of claim 1, wherein the instructions, when executed by the at least one processor, further cause the computing system to:
   determine that a false positive rate for performing object detection has changed; and
   based on the determination that the false positive rate has changed, adjust a security screening parameter of one or both of the first set of security screening parameters and the second set of security screening parameters, wherein the security screening parameter comprises an object detection confidence level for performing the object detection.

5. The computing system of claim 1, wherein the second set of security-related data comprises at least some security-related data that was not available during the initial security screening.

6. The computing system of claim 1, wherein the detection device communicatively coupled to the computing system is located at a departure security checkpoint; wherein the second security determination for the object comprises a determination that the object violates a condition, wherein the condition comprises at least one of a customs-related condition or a security-related condition; and wherein providing to the computing device the output notification based on at least one of (i) the first security determination or (ii) the second security determination comprises providing to a computing device located at an arrival location an output notification that indicates the violated condition.

7. The computing system of claim 6, wherein the output notification comprises an indication of at least one of: (1) passenger itinerary data associated with the object, (2) passenger identification data associated with the object, or (3) a location within the object corresponding to the violated security-related condition.

8. The computing system of claim 1, wherein the output notification provides an indication that the object contains an item known not to pose a security threat.

9. The computing system of claim 1, wherein the instructions, when executed by the at least one processor, further cause the computing system to:
   determine that a security-related condition has changed; and
   change at least one of the first security screening parameters or the second set of security screening parameters based on the determination that the security-related condition has changed.

10. The computing system of claim 9, wherein the changed security-related condition comprises at least one of: an increase in object screening throughput, a change in a security threat level, or a change in a class of item to be detected.

11. A method comprising:
    performing an initial security screening on an object based on (i) a first set of security-related data associated with the object comprising first image data corresponding to a first scan of the object by a detection device communicatively coupled to the computing system and (ii) a first set of security screening parameters, wherein performing the initial security screening comprises:
  based on the first image data, executing a neural network in accordance with the first set of security screening parameters; and
  based on executing the neural network in accordance with the first set of security screening parameters, generating a first security determination for the object;
performing a supplemental security screening on the object based on (i) a second set of security-related data associated with the object comprising at least one of (a) the first image data or (b) second image data corresponding to a second scan of the object and (ii) a second set of security screening parameters, wherein performing the supplemental security screening comprises:
  based on at least one of (a) the first image data or (b) the second image data, executing a neural network in accordance with the second set of security screening parameters; and
  based on executing the neural network in accordance with the second set of security screening parameters, generating a second security determination for the object; and
providing to a computing device an output notification based on at least one of (i) the first security determination or (ii) the second security determination; and
wherein the first set of security-related data is different from the second set of security-related data, and wherein the first set of security screening parameters is different from the second set of security screening parameters.

12. The method of claim 11, wherein performing the initial security screening comprises, based on executing the neural network in accordance with the first set of security screening parameters, performing object detection on the first image data to determine whether a class of item can be identified from the first image data, and wherein performing the supplemental security screening further comprises, based on executing the neural network in accordance with the second set of security screening parameters, performing object detection on the at least one of the first image data or the second image data to determine whether a class of item can be identified from the at least one of the first image data or the second image data.

13. The method of claim 11, further comprising:
determining that a false positive rate for performing object detection has changed; and
based on the determination that the false positive rate has changed, adjusting a security screening parameter of one or both of the first set of security screening parameters and the second set of security screening parameters, wherein the security screening parameter comprises an object detection confidence level for performing the object detection.

14. The method of claim 11, further comprising:
determining that a security-related condition has changed; and
changing at least one of the first security screening parameters or the second set of security screening parameters based on the determination that the security-related condition has changed.

15. The method of claim 14, wherein the changed security-related condition comprises at least one of: an increase in object screening throughput, a change in a security threat level, or a change in a class of item to be detected.

16. A tangible non-transitory computer-readable storage medium comprising instructions stored thereon that, when executed by at least one processor, cause a computing system to:
perform an initial security screening on an object based on (i) a first set of security-related data associated with the object comprising first image data corresponding to a first scan of the object by a detection device communicatively coupled to the computing system and (ii) a first set of security screening parameters, wherein performing the initial security screening comprises:
  based on the first image data, executing a neural network in accordance with the first set of security screening parameters; and
  based on executing the neural network in accordance with the first set of security screening parameters, generating a first security determination for the object;
perform a supplemental security screening on the object based on (i) a second set of security-related data associated with the object comprising at least one of (a) the first image data or (b) second image data corresponding to a second scan of the object and (ii) a second set of security screening parameters, wherein performing the supplemental security screening comprises:
  based on at least one of (a) the first image data or (b) the second image data, executing a neural network in accordance with the second set of security screening parameters; and
  based on executing the neural network in accordance with the second set of security screening parameters, generating a second security determination for the object; and
provide to a computing device an output notification based on at least one of (i) the first security determination or (ii) the second security determination; and
wherein the first set of security-related data is different from the second set of security-related data, and wherein the first set of security screening parameters is different from the second set of security screening parameters.

17. The non-transitory computer-readable storage medium of claim 16, wherein performing the initial security screening further comprises, based on executing the neural network in accordance with the first set of security screening parameters, performing object detection on the first image data to determine whether a class of item can be identified from the first image data, and wherein performing the supplemental security screening further comprises, based on executing the neural network in accordance with the second set of security screening parameters, performing object detection on the at least one of the first image data or the second image data to determine whether a class of item can be identified from the at least one of the first image data or the second image data.

18. The non-transitory computer-readable storage medium of claim 16, wherein the instructions, when executed by the at least one processor, further cause the computing system to:
determine that a false positive rate for performing object detection has changed; and
based on the determination that the false positive rate has changed, adjust a security screening parameter of one or both of the first set of security screening parameters and the second set of security screening parameters, wherein the security screening parameter comprises an object detection confidence level for performing the object detection.

19. The non-transitory computer-readable storage medium of claim 16, wherein the instructions, when executed by the at least one processor, further cause the computing system to:

determine that a security-related condition has changed; and change at least one of the first security screening parameters or the second set of security screening parameters based on the determination that the security-related condition has changed.

20. The non-transitory computer-readable storage medium of claim 19, wherein the changed security-related condition comprises at least one of: an increase in object screening throughput, a change in a security threat level, or a change in a class of item to be detected.

* * * * *